(12) United States Patent
Shimizu

(10) Patent No.: US 7,021,769 B2
(45) Date of Patent: Apr. 4, 2006

(54) REAR PROJECTOR FOR PROJECTING AN IMAGE FROM A REAR SIDE OF A SCREEN

(75) Inventor: Hitoshi Shimizu, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/846,662

(22) Filed: May 17, 2004

(65) Prior Publication Data

US 2004/0233396 A1 Nov. 25, 2004

(30) Foreign Application Priority Data

May 22, 2003 (JP) ............................. 2003-145032

(51) Int. Cl.
- G03B 21/22 (2006.01)
- G03B 21/14 (2006.01)
- G03B 21/00 (2006.01)
- G02F 1/1335 (2006.01)

(52) U.S. Cl. ............................ 353/74; 353/20; 353/31; 353/33; 353/79; 353/99; 349/5; 349/9

(58) Field of Classification Search ................. 353/20, 353/31, 33, 34, 37, 74, 77, 79, 98, 99, 78; 349/5, 7, 8, 9

See application file for complete search history.

(56) References Cited

U.S. PATENT DOCUMENTS

| 6,508,554 B1* | 1/2003 | Hatakeyama et al. .......... 353/31 |
| 6,575,578 B1* | 6/2003 | Ito .............................. 353/37 |
| 6,893,131 B1* | 5/2005 | Imahase et al. ................ 353/31 |

FOREIGN PATENT DOCUMENTS

JP 2002-141025 5/2002

* cited by examiner

Primary Examiner—Melissa Jan Koval
(74) Attorney, Agent, or Firm—Young & Thompson

(57) ABSTRACT

A light-source unit is disposed such that illumination light is horizontally emitted relative to an oblong screen. Three liquid-crystal display panels respectively have a liquid-crystal display surface of a rectangle. The display panels are disposed in a lengthwise posture and in a state that longer sides of the display surfaces are parallel with each other. At the same time, all the longer sides are perpendicular to a reference plane. A projection optical system is provided with a reflex mirror for perpendicularly bending an optical path. A rotation optical system for rotating projection light by 90 degrees is constituted of the reflex mirror and a plane mirror disposed behind the screen.

12 Claims, 6 Drawing Sheets

REAR PROJECTOR FOR PROJECTING AN IMAGE FROM A REAR SIDE OF A SCREEN

BACKGROUND OF THE INVENTION

1. Field of the Invention

The present invention relates to a rear projector for projecting an image form a rear side of a screen by using a plurality of image display panels.

2. Description of the Related Art

In recent years, a rear projection television draws attention as a large-sized display device. The rear projection television is constituted of a screen built in a housing, a plane mirror disposed behind the screen, and a projector engine (main component of projector) for emitting projection light toward the plane mirror. The projector engine is provided with an illumination optical system, image display panels and a projection optical system. The illumination optical system produces uniform illumination light from the light of a high-intensity light source. The image display panels form an original image by modulating the illumination light. The projection optical system enlarges and radiates the projection light to which image information is given by the image display panels.

The projector engine is generally disposed at a position where the projection light is upwardly radiated toward the plane mirror inclined relative to the screen and placed at the rear side thereof. As to the rear projection television, a depth of the housing is reduced by standing the plane mirror as parallel as possible with a surface of the screen so as to hold down an inclination angle of the plane mirror rather than 45 degrees. Therefore, the projector engine is built in such as to confront the plane mirror and such as to radiate the projection light in an oblique-and-upward direction(see Japanese Patent Laid-Open Publication No. 2002-141025, for instance).

A conventional rear projector, however, employs a projector engine in which radiating directions of the illumination light and the projection light are parallel. Thus, there arises a problem in that a size increases in a depth direction. For example, when the conventional projector engine is horizontally placed to lead the projection light to the screen along a Z-shaped optical path formed by using two plane mirrors, the whole length of the projector engine is long in spite of holding down the inclinations of the plane mirrors. Due to this, it is necessary to redundantly secure the depth size of the housing.

SUMMARY OF THE INVENTION

In view of the foregoing, it is a primary object of the present invention to provide a rear projector in which a projector engine is disposed so as to be efficiently contained.

It is a second object of the present invention to provide a rear projector whose depth is reduced.

In order to achieve the above and other objects, the rear projector according to the present invention comprises a light source, a color-separating optical system, a plurality of image display panels, a color-synthesizing optical system, a projection optical system, a reflex optical element, and a plane mirror. The light source emits illumination light in a direction being parallel with a screen. The color-separating optical system separates the illumination light into at least three-primary-color lights. The image display panels modulate the primary-color lights to emit projection lights representing primary-color images respectively. Each of the image display panels has a rectangle display surface for displaying a correspondence image corresponding to each primary-color ingredient. The color-synthesizing optical system synthesizes the projection lights of the primary colors transmitted from the image display panels. The projection optical system enlarges the synthesized projection light of a full-color image, and projects it to the screen. The reflex optical element is formed with a reflecting surface for bending an optical path of the projection light. The plane mirror is disposed between the reflex optical element and the screen. The image display panels are disposed in a posture that longer sides of the respective display surfaces are perpendicular to a reference plane, which is parallel with paths of the illumination light and the projection light in the color-separating and color-synthesizing optical systems. The reflex optical element is disposed such that a first plane is perpendicular to a second plane. The first plane includes incidence and reflex optical axes of the projection light reflected by the reflecting surface of the reflex optical element. The second plane includes incidence and reflex optical axes of the projection light reflected by the plane mirror.

In a preferred embodiment of the rear projector, are unitized the light source, the color-separating optical system, the respective image display panels, the color-synthesizing optical system and the projection optical system to form a parallelepiped unit. The unit being as the projector engine is disposed such that a longitudinal direction thereof is parallel with a longer side of the rectangular screen. An elevation angle of the projection light is changed by merely rotating the projector engine around an axis extending in the longitudinal direction.

According to the present invention, the longitudinal direction of the projector engine is parallel with a screen surface. Thus, even if the plane mirror disposed behind the screen has a small inclination angle, the projector engine is prevented from protruding out of a depth of a housing so that it is possible to reduce the depth of the rear projector. Further, the image display panels are disposed in the lengthwise posture so that it is possible to downsize the optical component used for the color separation and synthesize. This is advantageous as to lowering in cost and reduction of weight.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
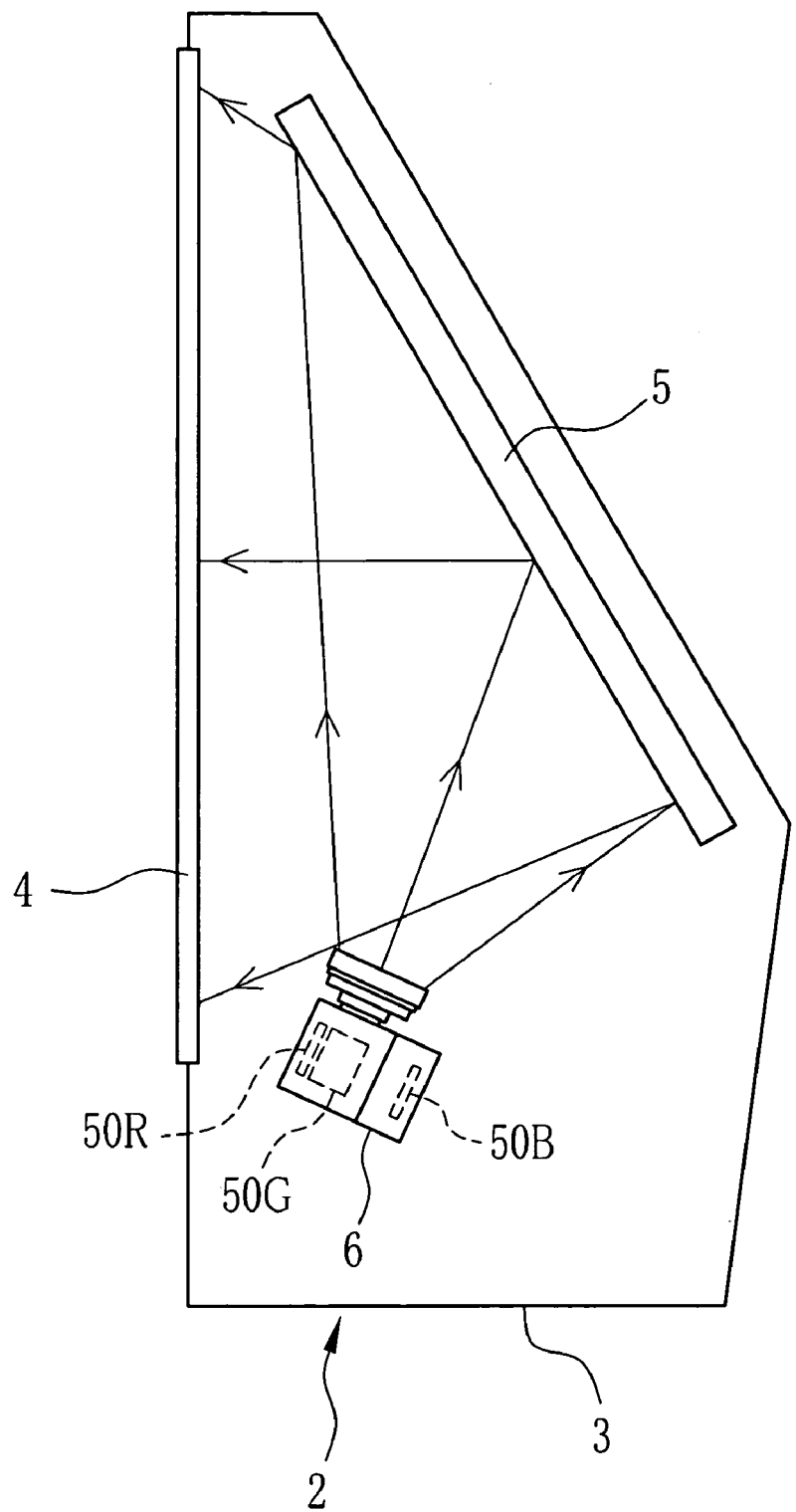
FIG. 1 is a schematic illustration showing a structure of a rear projector.

In FIG. 1, a rear projector 2 comprises a screen 4 disposed at a front side of a housing 3, a plane mirror 5 disposed behind the screen 4, and a projector engine 6. The plane mirror 5 is obliquely set such that its inclination angle relative to the screen 4 is less than 45 degrees. The projector engine 6 has a built-in projection lens whose optical axis is inclined against the screen 4. Projection light emitted from the projector engine 6 is obliquely-and-upwardly radiated and is reflected by the plane mirror 5 to project an image to the screen 4. A reversed projection image is projected on the back of the screen 4, and an erect projection image is viewed from the front of the screen 4.

Figure 2:
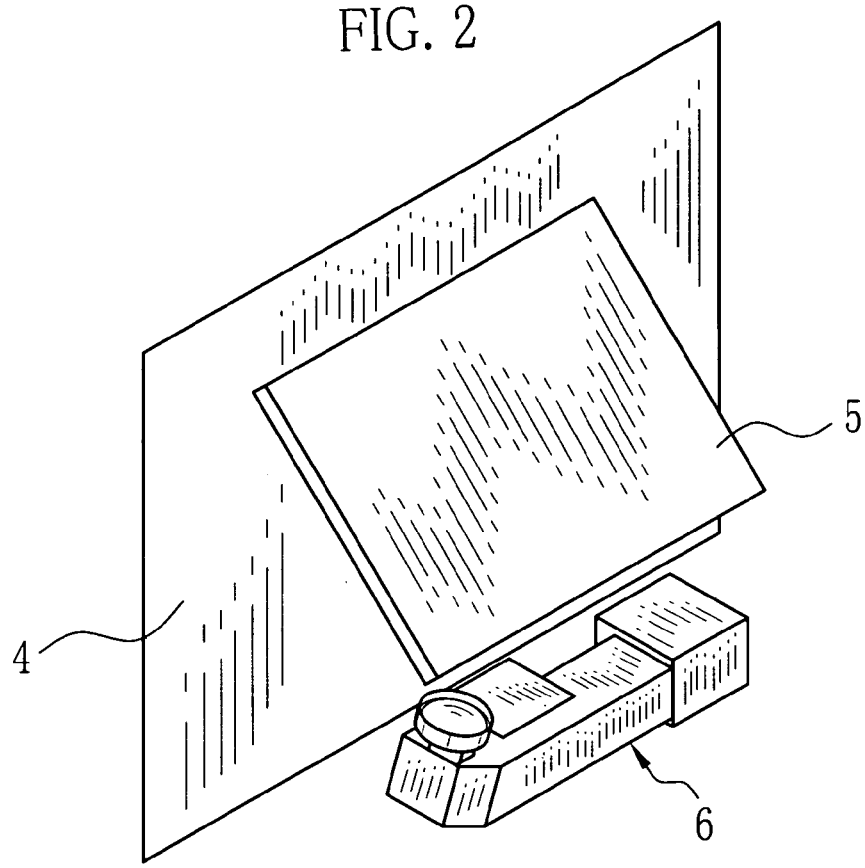
FIG. 2 is a perspective view showing arrangement of main parts contained in the rear projector.

In FIG. 2, the screen 4 has an oblong rectangular shape comprising a horizontal longer side and a perpendicular shorter side. The plane mirror 5 is inclined in a state that an upper side thereof is near to the screen 4 along a reference axis being parallel with the longer side of the screen 4. The plane mirror 5 is disposed so as to reduce a depth size of the housing 3 and so as to make its inclination a half right angle or less relative to a screen surface.

Figure 3:
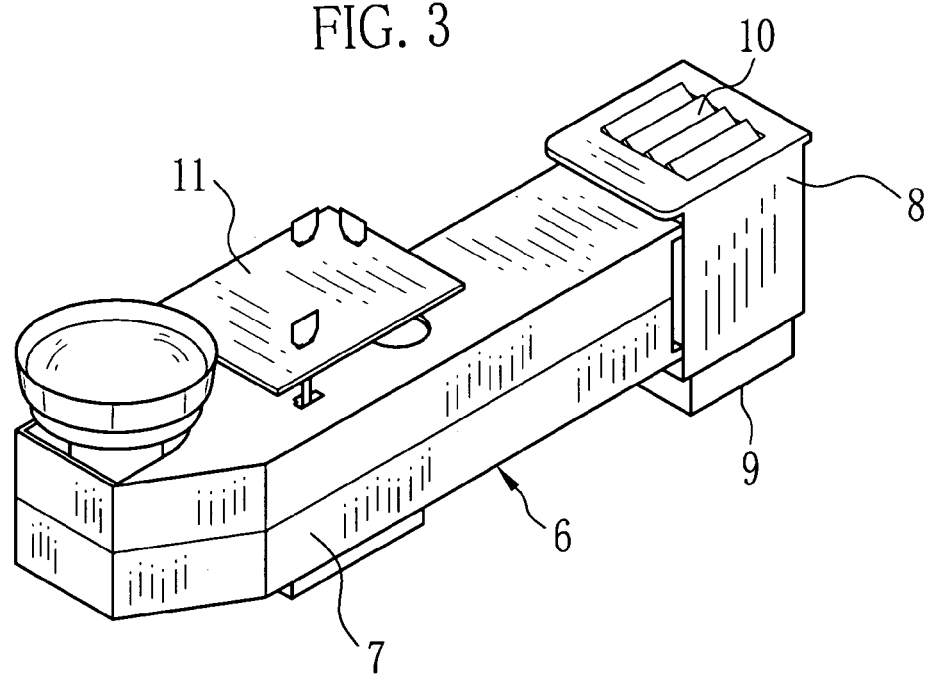
FIG. 3 is a perspective view showing a projector engine.

In FIG. 3, the projector engine 6 comprises an optical-system container 7 and a light-source container 8 including a ventilator 10 and a ventilation fan 9 for cooling a light source. A light-source unit 14 for emitting high-intensity illumination light is contained in the light-source container 8. The optical-system container 7 has a rectangular cylindrical shape and is provided with an illumination optical path connected to the light-source container 8. The optical-system container 7 contains color separating/synthesizing optical systems and a projection optical system in a unitized state. A circuit board 11 is provided with a driver circuit and so forth for driving reflex liquid-crystal display panels, which are described later, on the basis of an image signal externally inputted.

Figure 4:
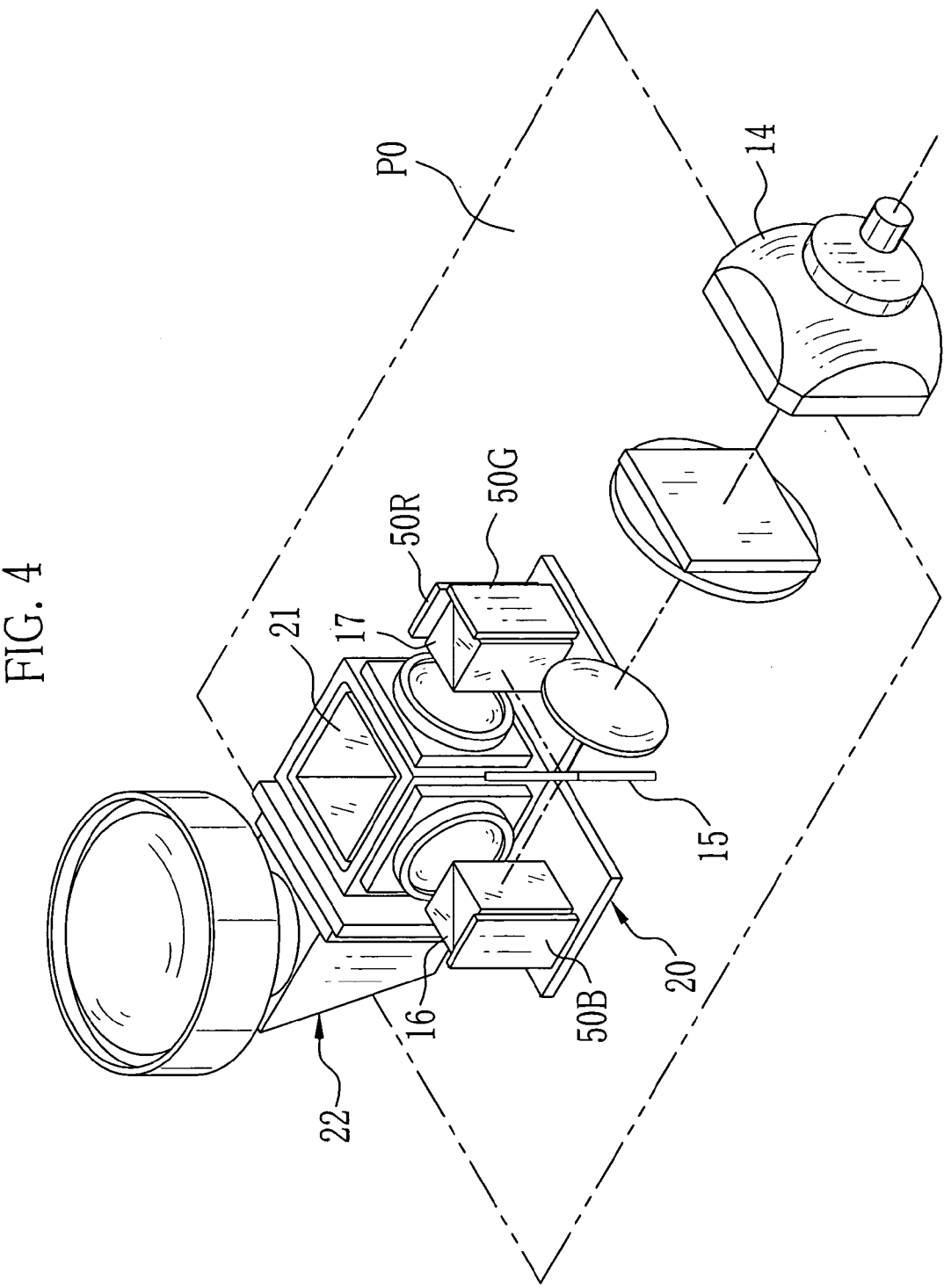
FIG. 4 is a perspective view showing an internal structure of the projector engine.

In FIG. 4, as to the light-source unit 14 contained in the light-source container 8, high-intensity light sources of a metal halide lamp, a super-high pressure mercury lamp, a xenon lamp and so forth are usable in accordance with a purpose of use. The light emitted from the light-source unit 14 passes through an illumination optical system disposed at the illumination optical path, which is parallel to the longer side of the screen 4, to become the strong-and-uniform illumination light. The illumination optical system comprises a fly-eye lens, a polarization conversion element, a condenser lens and so forth.

The white illumination light from the light-source unit 14 enters a dichroic mirror 15 and is separated into blue illumination light and yellow illumination light. The blue illumination light passes through the dichroic mirror 15 and goes straight to enter a polarizing prism 16. The yellow illumination light is reflected by the dichroic mirror 15 and goes in a perpendicular direction to enter a polarized beam splitter 17. The polarizing prism 16 has a polarizing reflection plane 16a inclining at 45 degrees relative to an advancing direction of the blue illumination light. The blue illumination light having entered from an incidence surface of the polarizing prism 16 is reflected toward a liquid-crystal display panel 50B. The polarizing reflection plane 16a transmits blue projection light having image information obtained by reciprocating in the liquid-crystal display panel 50B.

The polarized beam splitter 17 has an incidence surface, an emission surface, and a polarized beam split surface 17a for separating the yellow illumination light reflected by the dichroic mirror 15 into red illumination light and green illumination light. Further, liquid-crystal display panels 50G and 50R are disposed so as to confront two surfaces of the polarized beam splitter 17. The liquid-crystal display panel 50G modulates the green illumination light reflected by the polarized beam split surface 17a, to green projection light having image information. The liquid-crystal display panel 50R modulates the red illumination light transmitted from the polarized beam split surface 17a, to red projection light having image information. The green projection light from the liquid-crystal display panel 50G passes through the polarized beam split surface 17a and goes straight. The red projection light from the liquid-crystal display panel 50R is reflected by the polarized beam split surface 17a and goes in a perpendicular direction. The projection light of two colors is synthesized in this way, and then, is emitted from the emission surface.

The liquid-crystal display panels 50B, 50G and 50R are attached to a prism retainer 20 together with the polarizing prism 16, the polarized beam splitter 17 and a projection optical system 22 in which a synthesizing prism 21 for synthesizing the projection light of the respective colors are disposed between lenses. The synthesizing prism 21 synthesizes the blue projection light, the red projection light and the green projection light as the projection light having full-color image information. The blue projection light enters the synthesizing prism 21 from the polarizing prism 16. The red projection light and the green projection light enter the synthesizing prism 21 from the polarized beam splitter 17.

As to the refection-type liquid-crystal display panels 50B, 50G and 50R, liquid crystal is interposed between a transparent glass plate and a silicon substrate. A driving circuit is formed on the silicon substrate, and an aluminum reflex surface is formed on an inner surface thereof. The light having passed through the transparent glass plate is reflected by the reflex surface, and then, is emitted from the transparent glass plate. A common electrode is formed on the transparent glass plate. A large number of individual electrodes are formed on the silicon substrate. A large number of liquid-crystal pixels are arranged in matrix in the reflection-type liquid-crystal display panel. Each of the display panels shows a monochrome image by controlling a transmitted-light amount or a transmittance of the respective liquid-crystal pixels on the basis of image data. The monochrome image is illuminated by the illumination light to become visible. By means of the three liquid-crystal display panels, the illumination light of the respective colors is modulated to the projection light having the image information. Each of the liquid-crystal display panels has a rectangular display surface for displaying the image, which corresponds to each color ingredient. An aspect ratio of the display surface is 16 to 9, for instance. The liquid-crystal display panels are disposed in a lengthwise posture and in a state that longer sides of the display surfaces are parallel with each other. Moreover, the longer sides of the liquid-crystal display panels are perpendicular to a reference plane P0 being parallel with an optical path along which the illumination light advances from the light-source unit 14 through the synthesizing prism 21 until the illumination light becomes the projection light including the full-color image information.

Each of the polarizing-prism 16 and the polarized beam splitter 17 has a parallelepiped shape corresponding to the display surface of the respective liquid-crystal display panels disposed in the lengthwise posture. The parallelepiped shape has a square bottom, one side of which corresponds to a shorter side of the display surface. A vertical length of the parallelepiped shape corresponds to a longer side of the display surface. In the present embodiment, the display surface of the liquid-crystal display panel has a size for displaying the image whose aspect ratio is 16 to 9. In comparison with a case in that the respective liquid-crystal display panels are disposed in an oblong posture and in a state that the shorter sides of the display surfaces are parallel with each other, a volume ratio of each prism is $(9^2 \cdot 16)$ to $(16^2 \cdot 9)$. In other words, when the liquid-crystal display panels are disposed in the posture of this embodiment, it is possible to reduce the size of the prism about 9/16 times.

Figure 5:
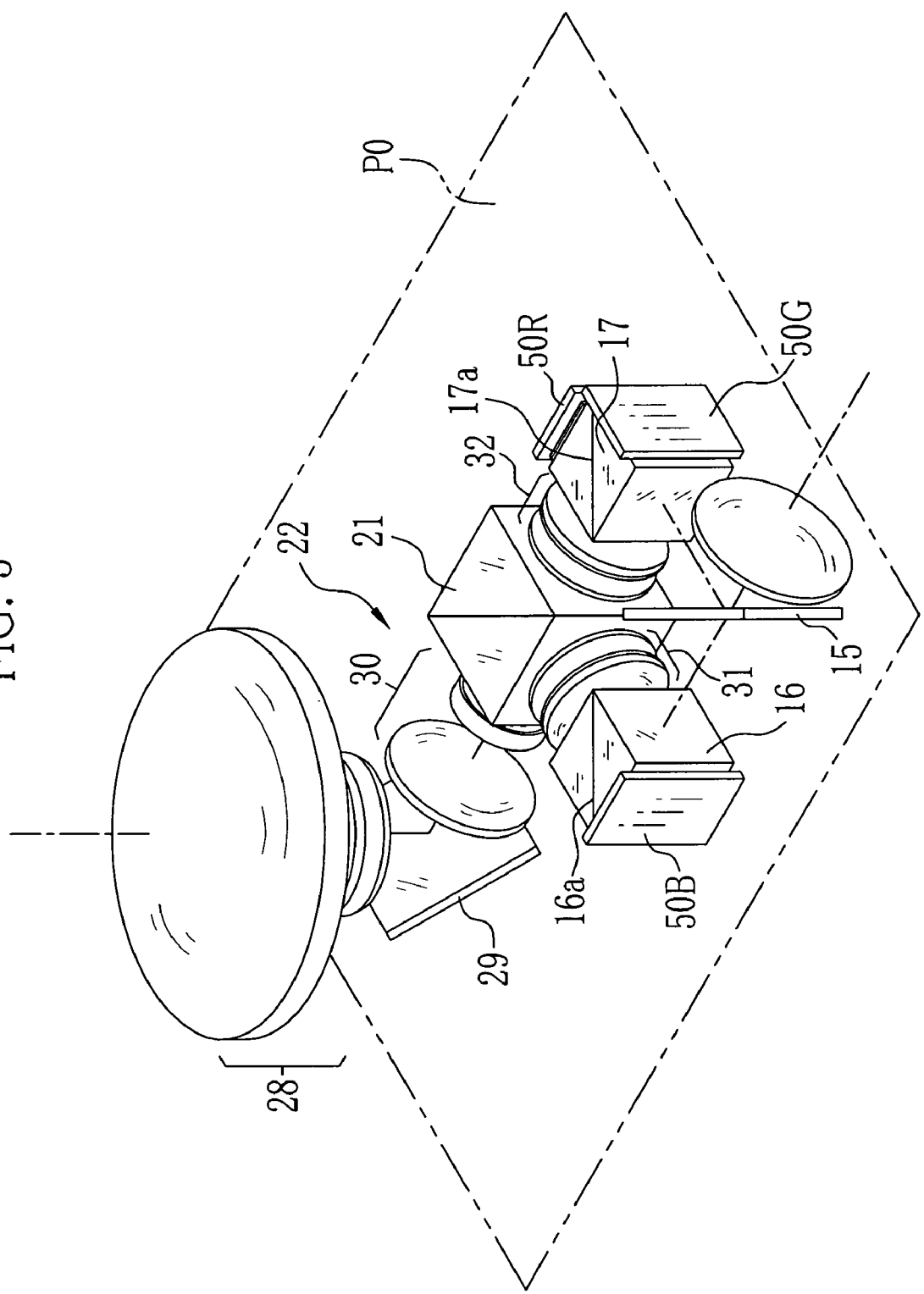
FIG. 5 is a perspective view showing three-color separating/synthesizing optical systems and a projection optical system.

In FIG. 5, the projection optical system 22 comprises a front optical system disposed at an enlargement side of the synthesizing prism 21, and a rear lens group disposed at a reduction side of the synthesizing prism 21. The front optical system comprises a first front lens group 28 of the enlargement side and a second front lens group 30 of the reduction side. The rear lens group comprises a first rear lens group 31 disposed at the optical path of the blue projection light, and a second rear lens group 32 disposed at the optical path of the red and green projection light. The image made by the respective liquid-crystal display panels is formed on the screen by means of the front optical system and the rear lens group.

A reflex mirror 29 has a flat reflecting plane and is disposed between the first front lens group 28 and the second front lens group 30 so as to be inclined at 45 degrees. Optical axes of the first and second lens groups 28 and 30 are perpendicular to each other on the reflecting plane of the reflex mirror 29. By the way, instead of the reflex mirror 29, it is possible to use a rectangular prism in which a reflection coating is formed on an oblique surface. The reflex mirror 29 perpendicularly turns an advancing direction of the projection light transmitted from the synthesizing prism 21.

Figure 6:
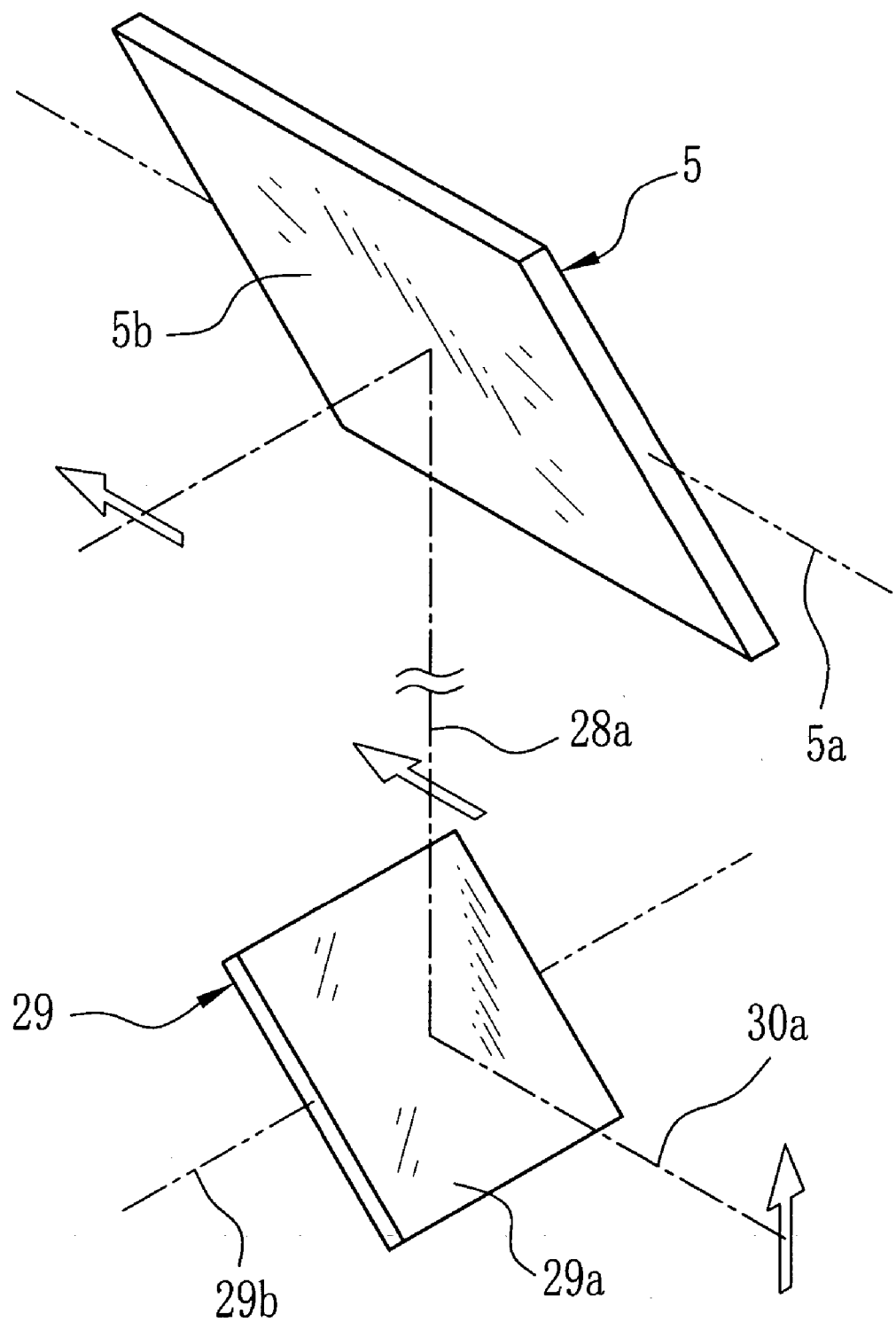
FIG. 6 is an explanatory illustration showing an image-rotating optical system.

In FIG. 6, an inclination reference axis 29b is defined at the reflecting surface 29a of the reflex mirror 29 in order to specify the inclination state of the reflex mirror 29. The reflex mirror 29 is set so as to rotate the reflecting surface 29a around the inclination reference axis 29b. This inclination reference axis 29b is perpendicular to the optical axes 28a and 30a of the first and second front lens groups 28 and 30. In other words, the inclination reference axis 29b is an axis line being perpendicular to an incidence optical path and a reflection optical path of the projection light transmitted to the reflecting surface 29a. Meanwhile, the plane mirror 5 is obliquely set so as to rotate a reflecting surface 5b thereof around an inclination reference axis 5a, which has a positional relationship of torsionally turning in a perpendicular direction relative to the inclination reference axis 29b. An image-rotating optical system for rotating an image by 90 degrees is constructed by combining the reflex mirror 29 and the plane mirror 5.

The liquid-crystal display panels 50B, 50G and 50R are disposed in the lengthwise posture, and the optical path of the projection light transmitted therefrom is perpendicularly bent by the reflex mirror 29 in the projection optical system 22. The projection light perpendicularly bent is reflected by the plane mirror 5 toward the screen 4 to form an oblong image on the rectangular screen 4. Since the longitudinal direction of the projector engine 6, which is from the light-source container 8 toward the first front lens group 28, is parallel with the screen surface, the projector engine 6 is disposed so as to be fully contained in a depth of the rear projector 2 determined by a size and an inclination angle of the plane mirror 5.

Figure 7:
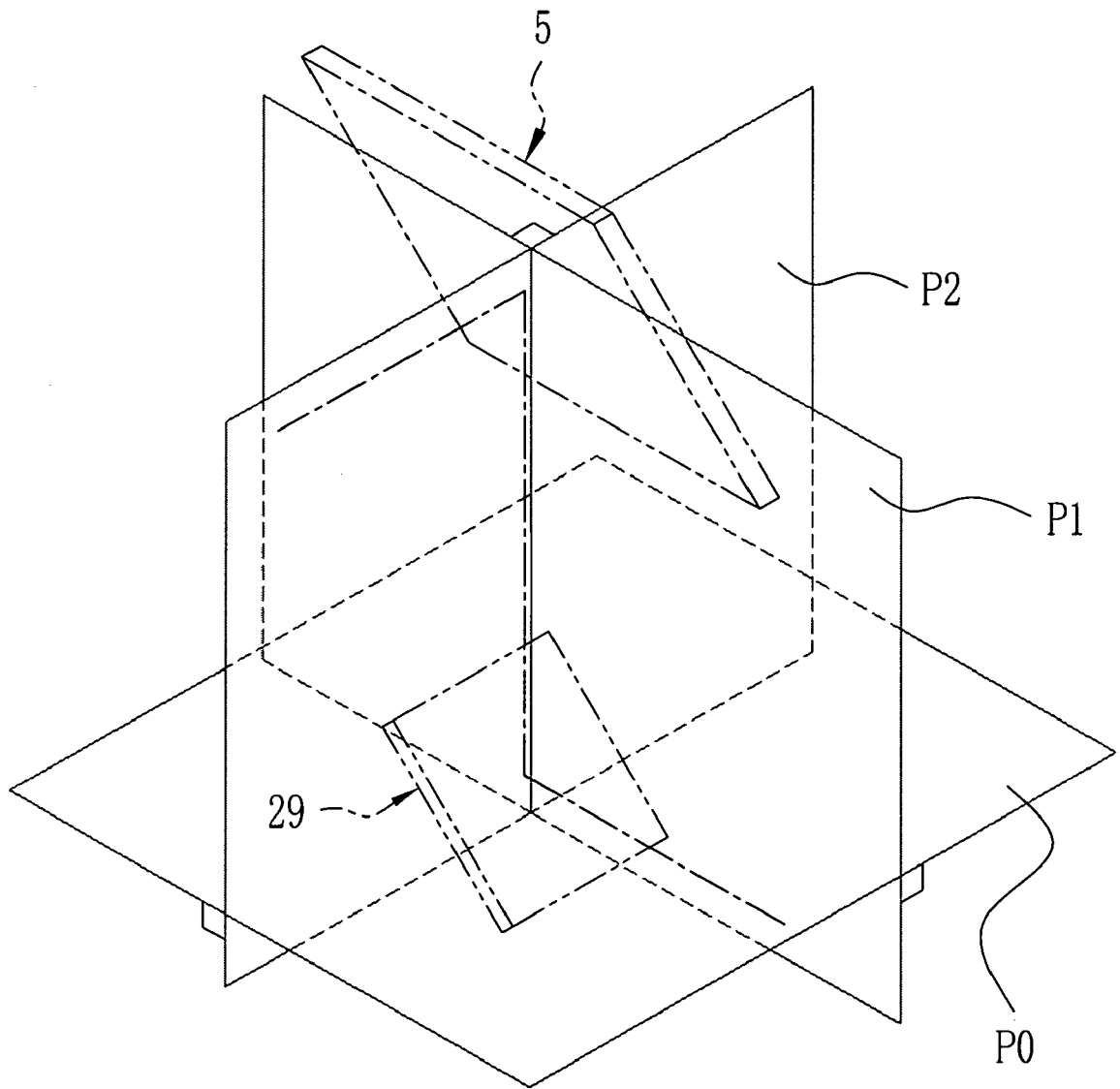
FIG. 7 is an explanatory illustration showing an advancing direction of light reflected by a reflex mirror and a plane mirror.

In FIG. 7, as to the image-rotating optical system constituted of the plane mirror 5 and the reflex mirror 29, a plane P1 shown in this drawing includes an advancing direction of the axial light transmitted from the synthesizing prism 21 to the reflex mirror 29. The plane P1 also includes another advancing direction of the axial light reflected by the reflex mirror 29. The axial light to be transmitted from the reflex mirror 29 to the plane mirror 5 advances on a plane P2 shown in the drawing. The axial light reflected by the plane mirror 5 also advances on the plane P2. The planes P1 and P2 are perpendicular to each other, and the plane P2 is perpendicular to a reference plane P0 as well. When an inclination angle of the plane mirror 5 is changed, the advancing direction of the projection light is changed on the plane P2. In accordance with this, the projector engine 6 is rotated around an axis extending in the longitudinal direction thereof. However, a posture of the light-source unit 14 is not changed without regard to the rotation of the projector engine 6.

In the above embodiment, the reflex mirror 29 is disposed in the projection optical system so as to reduce a mirror size. However, the reflex mirror 29 may be disposed in the projector engine so as to be positioned at a screen side of the projection optical system or between the synthesizing prism and the projection optical system. Alternatively, the reflex mirror 29 may be disposed at the outside of the projector engine. When adopting the present invention, plane mirrors may be disposed between the projector engine and the screen, for example, to sufficiently secure a projection distance for heightening a projection magnification. In this case, by merely rotating the projector engine around the axis of the longitudinal direction, an elevation angle of the projection light may be changed relative to a horizontal plane. Further, it is possible to commonly use the projector engine of the same structure by merely changing an assembly posture thereof.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A rear projector in which an image projected to a rear side of a screen is viewed from a front side of said screen, said rear projector comprising:
   a light source for emitting an illumination light in a parallel direction with a surface of said screen;
   a color-separating optical system for separating said illumination light into at least three-primary-color lights;
   a plurality of image display panels for modulating said color-separated lights of blue, green and red to emit projection lights representing a blue image, a green image and a red image respectively, each of said image display panels having a rectangular display surface for displaying a correspondence image corresponding to each primary-color ingredient;
   a color-synthesizing optical system for synthesizing said projection lights of blue, green and red emitted from the respective image display panels to produce a projection light of a full-color image;
   a projection optical system for enlarging said color-synthesized full-color image to project it to said screen;
   a reflex optical element formed with a reflecting surface for bending an optical path of said projection light;

a plane mirror disposed between said reflex optical element and said screen; and wherein said image display panels are disposed in a posture that longer sides of the respective display surfaces are perpendicular to a reference plane being parallel with paths of the illumination light and the projection light advancing in said color separating and synthesizing optical systems, and said reflex optical element is disposed in a posture that a first plane, which includes incidence and reflex optical axes of the projection light reflected by the reflecting surface of the reflex optical element, is perpendicular to a second plane, which includes incidence and reflex optical axes of the projection light reflected by said plane mirror.

2. A rear projector according to claim 1, wherein said light source, said color-separating optical system, said image display panels, said color-synthesizing optical system and said projection optical system are unitized to form a unit having a parallelepiped shape, said unit being disposed such that a longitudinal direction thereof is parallel with a longer side of said rectangular screen.

3. A rear projector according to claim 2, wherein said light source is a high-intensity light source and is one of a metal halide lamp, a super-high pressure mercury lamp and a xenon lamp.

4. A rear projector according to claim 2, wherein said color-separating optical system comprises:
   a dichroic mirror for separating the white illumination light into a blue illumination light and a yellow illumination light; and
   a polarized beam splitter for separating said yellow illumination light into a red illumination light and a green illumination light.

5. A rear projector according to claim 4, wherein said image display panels comprises:
   a first liquid-crystal display panel of a reflection type for displaying said blue image in monochrome;
   a second liquid-crystal display panel of a reflection type for displaying said green image in monochrome; and
   a third liquid-crystal display panel of a reflection type for displaying said red image in monochrome.

6. A rear projector according to claim 5, further including:
   a polarizing prism having a first incidence surface, a first emission surface and a polarizing reflection plane inclining at 45 degrees, said polarizing prism being disposed so as to confront said first liquid-crystal display panel;
   wherein said blue illumination light having entered from said first incidence surface is reflected by said polarizing reflection plane toward said first liquid-crystal display panel, and the blue projection light returned from said first liquid-crystal display panel passes through said polarizing reflex plane and is emitted from said first emission surface.

7. A rear projector according to claim 6, wherein tow faces of said polarized beam splitter confront said second liquid-crystal display panel and said third liquid-crystal display panel respectively, said polarized beam splitter comprising:
   a second incidence surface from which said yellow illumination light enters;
   a second emission surface from which the green projection light and the red projection light are emitted;
   a polarized beam split surface inclining at 45 degrees;
   wherein said yellow illumination light having entered from said second incidence surface is separated into said green illumination light and said red illumination light such that said green illumination light is reflected by said polarized beam split surface and said red illumination light passes through said polarized beam split surface;
   said green illumination light advances to said second liquid-crystal display panel, and said green projection light returned from said second liquid-crystal display panel passes through said polarized beam split surface and is emitted from said second emission surface;
   said red illumination light advances to said third liquid-crystal display panel, and said red projection light returned from said third liquid-crystal display panel is reflected by said polarized beam split surface and is emitted from said second emission surface.

8. A rear projector according to claim 7, wherein said color-synthesizing optical system is a synthesizing prism for synthesizing said blue projection light, said green projection light and said red projection light.

9. A rear projector according to claim 8, further comprising:
   a prism retainer to which said synthesizing prism is attached, said first through third liquid-crystal display panels being also attached to said prism retainer.

10. A rear projector according to claim 8, wherein said projection optical system includes a front optical system disposed at an enlargement-side of said synthesizing prism, said front optical system comprising a first front lens group and a second front lens group disposed in order from said plane mirror.

11. A rear projector according to claim 10, wherein said reflex optical element is a mirror disposed between said first front lens group and said second front lens group.

12. A rear projector according to claim 11, wherein said mirror is disposed at an inclination angle of 45 degrees so as to perpendicularly bend said optical path of said projection light.

* * * * *